Figure 1:
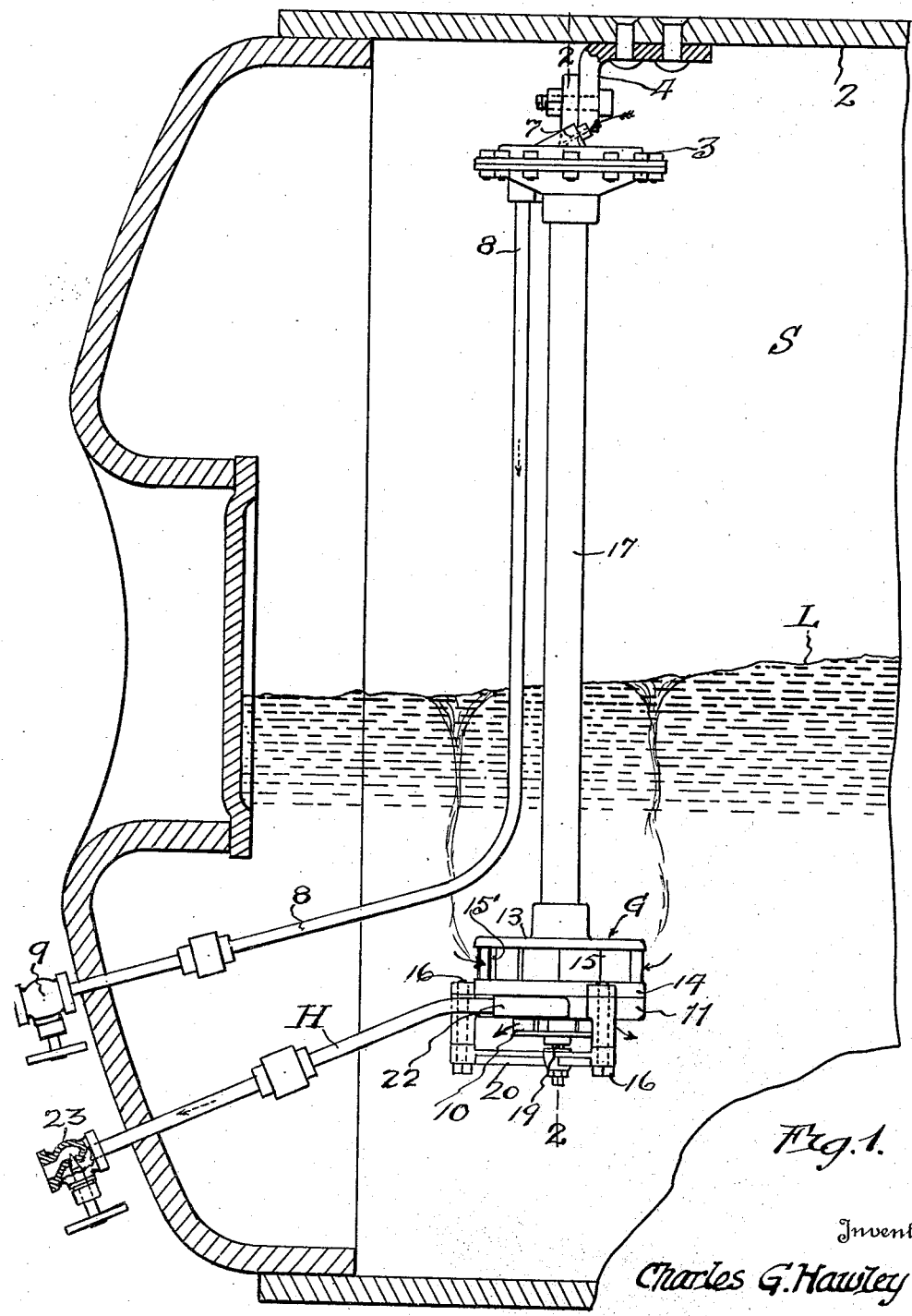

Sept. 20, 1932.  C. G. HAWLEY  1,878,848
DECONCENTRATOR
Filed Jan. 29, 1929   2 Sheets-Sheet 1

Inventor
Charles G. Hawley
By
Attorneys

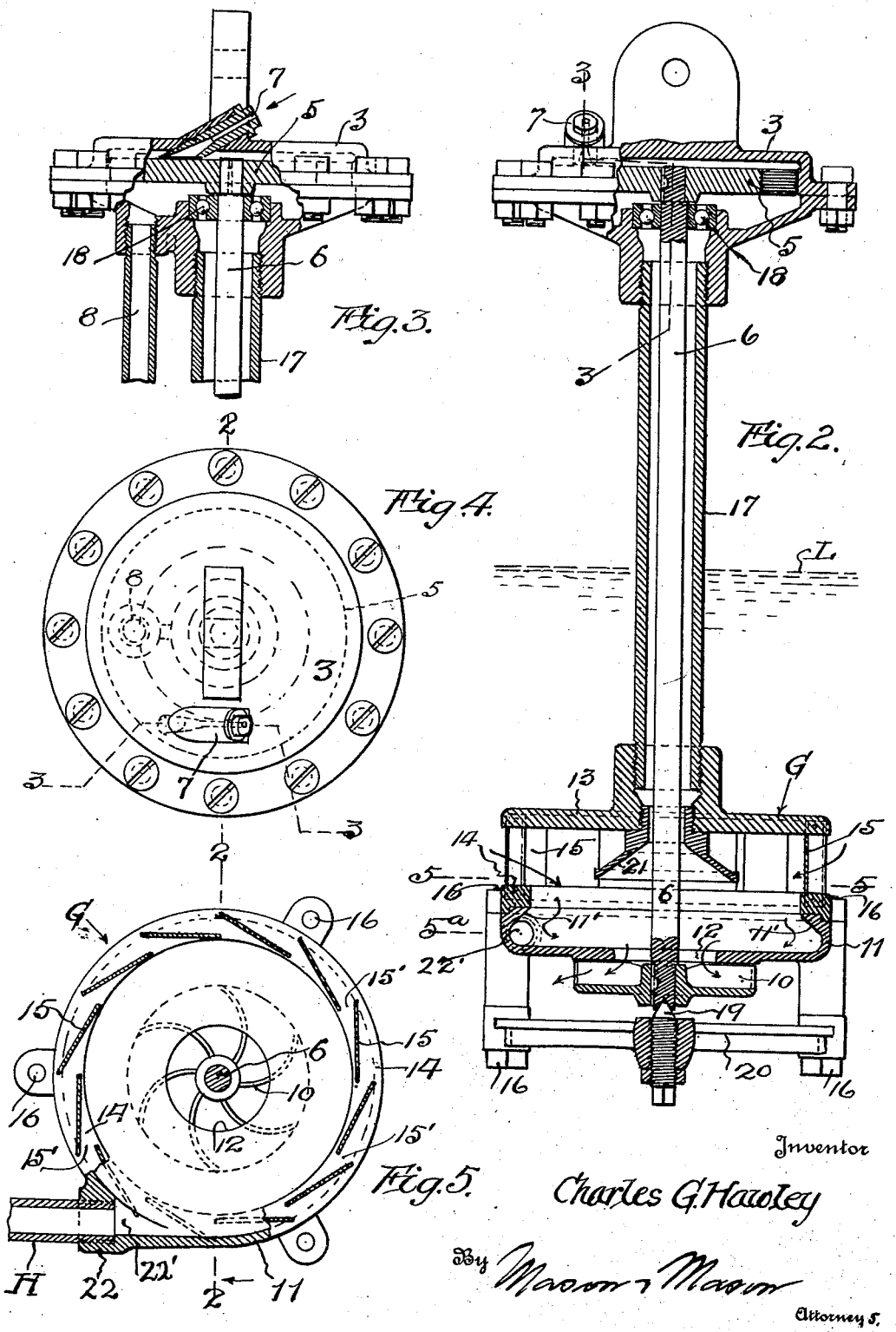

Patented Sept. 20, 1932

1,878,848

UNITED STATES PATENT OFFICE

CHARLES GILBERT HAWLEY, OF CHICAGO, ILLINOIS, ASSIGNOR TO CENTRIFIX CORPORATION, OF CLEVELAND, OHIO, A CORPORATION OF OHIO

DECONCENTRATOR

Application filed January 29, 1929. Serial No. 335,798.

This invention relates to the operation of steam boilers and comprises apparatus whereby a process of purification is performed upon boiler water, within the boiler and while it is most advantageously under the temperature and pressure incident to steam generation.

Purity of the steam, and operation continuously at high ratings and efficiencies, are the boiler ideals everywhere sought. In practice these ideals are defeated by the growing foulness of boiler waters as impure feed water continues to be supplied and evaporated, and by the fouling or "scaling" of the heating surfaces of the pressure vessel.

By maintaining the substantially complete cleanliness of the boiler water during operation, and hence the cleanliness of the steam, and cleanliness throughout the boiler it now becomes possible to attain these ideals throughout operating periods of great length. Incidentally, many common faults, difficulties and expenses are thus to be avoided.

The special object and accomplishment of this invention comprises the removal of impurities directly from the steaming water within the boiler, and, at a rate which substantially corresponds to, or exceeds, that at which fresh impurities are added through the medium of the feed water; and, this removal of impurities is not limited to mere inert solids in suspension but includes the removal of organic matters, oils and other substances which, if permitted to remain in any considerable quantity, would cause pitting, foaming and priming; and particularly includes the removal of soluble mineral substances, chiefly chemical salts, which, if retained, would result in hard and heavy scale formations, and also priming and foaming.

The process involved in the present invention attends the steaming operation of a boiler or generator containing a body of water that is maintained by a water feed proportioned to the discharge of pressure steam from the generator, and consists in setting up and maintaining, preferably by forces evolved within the generator, a locally defined movement within a limited part of the body of water, preferably at a point closely beneath the steam disengagement surface thereof, and in controlling or abruptly changing the direction of local flow to an extent which separates many of the contained impurities and causes their collection within a relatively small measure of water (a mixture hereinafter termed "concentrate"); and, in continuously segregating and discharging such concentrate from the generator at a rate which substantially compensates for, or exceeds, that at which fresh impurities enter the generator through the agency of the feed water.

As will further appear, a whirling flow or motion is instituted within the circulating water of the boiler, thus to bring about the above described separating action at a point beneath the disengagement surface; and, the centrifugal forces developed by the whirling motion afford the surest separation of the impurities and further, are a distinct aid in the final segregation and discharge of the concentrate.

By these steps the main body of water in the boiler or generator is maintained in a state of purity, or of low concentration, which permits the generator to be operated safely and continuously with highest efficiency and at high and varying ratings; and foaming, priming, and scaling are substantially wholly avoided. The "blow-off" or removal of the described concentrate is substantially continuous; but the quantity discharged is so small as to be virtually negligible in the heat balance.

By varying the quantity of the concentrate discharged, the boiler water may be held at any desired degree of concentration; and, it thus becomes possible to operate boilers in easy conformity with differing feed water conditions and different feed water treatments. With a little training, the operator, by merely observing the character of the concentrate discharged at any moment, may now learn and know the exact conditions obtaining in his boiler and in the steam off-put thereof.

This process lends itself to the correction of the faults of raw water boiler feeds; and yet, is most advantageously employed in conjunction with treatments used for the chemical betterment of feed waters. As will be apparent to those skilled in the art, the beneficial effects accruing herefrom are of much economic and engineering importance.

The invention will be readily understood upon reference to the accompanying drawings; in which:—Fig. 1 is a vertical section of a portion of a steam generator containing novel apparatus or deconcentrator adapted to the performance of the above described process of deconcentration;—Fig. 2 is a cross-section substantially on the line 2—2 of Figs. 1, 4 and 5;—Fig. 3 is a vertical section of the prime mover belonging to separating device or concentrator proper, on the line 3—3 of Figs. 2 and 4;—Fig. 4 is a top view of the device;—and Fig. 5 is a compound horizontal section of concentrator proper, on the lines 5—5 and 5ª of Fig. 2.

Fig. 1 discloses the end of a steam and water chamber or drum 2 belonging to a steam boiler. It has been deemed unnecessary to depict the other parts of the structure; and in particular the drum shown must be assumed to possess a steam outlet and also a feed water connection. The drum 2 is filled with water to the level L which incidentally represents the steam disengagement surface within the boiler. The space S above the water is normally filled with steam under pressure.

The water is normally at high temperature. At those temperatures, the impurities are readily separable; for at the high temperatures incident to high pressures, even the most difficultly separable salts and mineral substances exist in the form of particles, as contrasted with a state of suspension or solution.

If the boiler water were acted upon either before or after elevation to such temperatures many of these impurities would be found in a state of solution and would be most difficult of separation. Therefore this invention proceeds with the treatment of the water directly within the boiler itself and under the temperatures and pressures existing therein. The treatment ultimates in the concentration of boiler water impurities within a continuously discharged minute stream of boiler water; which, being got rid of outside of the boiler, leaves and keeps the boiler water in good condition, notwithstanding the continuous addition of impurities through the entrance of fresh feed water.

Importantly, such fixed or stationed device is of relatively small size, and its presence within the boiler does not interfere with or impede the boiler circulation as a whole.

The concentrator proper which is so dimensioned and used may partake of various designs but preferably is a centrifugal separator, G, placed below the disengagement surface in the boiler, and which is driven or caused to act by employing the expansive force of some of the steam from the upper part of the boiler.

Preferably the prime mover takes the form of a small steam turbine 3 which is hung from the top of the boiler, as by a bracket 4. That is, the casing of the turbine is thus suspended. The bladed runner 5 rotates within the casing, being fixed at the upper end of the upright shaft 6. Steam is admitted directly from the space S, as through the tangential nozzle 7, and having expended its force upon the rotor 5, is exhausted through a pipe 8. The latter contains a throttle valve 9 by means of which the use of steam and hence the speed of the turbine motor may be governed at will.

The shaft 6 hangs below the water level, L, and if desired may be used to drive a small centrifuge bowl for the separation of impurities within the water; but the proper collection and expulsion of impurities from such a centrifugal separator present difficulties not easy to overcome; and, therefore the described concentrator, G, is made to comprise a centrifugal separator of the non-rotative type, commonly known as a "Centrifix" and the turbine shaft 6 merely drives a small pump 10 which causes a positive movement of boiler water through the stationary separator G.

The device G comprises a separating pocket or bowl 11 having a central outlet 12 in its bottom and surmounted by an angularly or tangential bladed tuyere which provides the avenue through which water enters the pocket 11, and by which the water so entering is caused to whirl or rotate in the pocket.

The said tuyere comprises the top 13, the foot ring 14 and the many blades 15, just mentioned—all cast or built into a unitary structure which is fastened to the top of the bowl by a series of bolts 16.

Conveniently, the member 13 is rigidly united to the fixed casing of the turbine 3 as by a pipe section 17, which incidentally encloses the shaft 6. That shaft is held at the top by an anti-friction bearing 18 and at the bottom is slipped upon an anti-friction bearing 19. The latter is supported by a spider 20 which is fastened to the bowl and tuyere by the said bolts 16. The said pump runner 10 is fixed on the shaft 6 just below the central outlet 12 of the separator G and when propelled by the turbine serves to draw water downward through the separator. As indicated the speed and effectiveness of the pump are governed at the throttle 9 belonging to the turbine.

The device G also includes a central vortex cone 21, depending from its top, and which functions to divert impurities from the axial portion of the tuyére and to better direct them toward the inner periphery, 11', of the bowl, and hence away from the outlet.

The device G is completed by a tangential nozzle 22, the opening 22' of which leads tangentially from the bowl, in the direction of the rotation therein.

From the nozzle 22, a pipe H leads outward through the shell of the boiler and is equipped with a variable blow-off valve 23.

Normally, the boiler being in operation, the concentrator is completely submerged beneath the surface L. When the valve 9 is cracked open steam begins to rotate the pump 10 through the agency of the turbine 3. Then and thereafter a flow of boiler water is established in and through the concentrator G. The blades 15 form as many narrow tangential tuyéres 15' all having the same direction and obviously through these the water is delivered to the bowl in thin streams which are directed tangentially toward the periphery 11' of the bowl. A strong whirling action results and by these forces of placement and centrifugal retention the impurities in the water are concentrated at the said inner periphery of the bowl. Meantime the greater part of the carrying water is constantly exhausted by the pump 10, while the gathered impurities are whirled out through the peripheral nozzle 22. Thence they are discharged from the boiler through the pipe H and the valve 23.

By this simple means and always under definite control at the valves 9 and 23, a small quantity of concentrate is continuously abstracted or blown off from the boiler and thereby the boiler water as a body is kept from becoming foul or, relatively, unfit for use.

No other blowing down of the boiler need be provided for, except at times when the boiler is to be emptied and taken out of service. For that purpose the presence of a bottom drain is assumed.

To be specially remarked is the fact that the power actuated centrifugal separators herein disclosed are adapted for use in the lower parts of the circulatory systems of boilers. The arrangements are so obvious in the light of the present disclosure that it has been thought unnecessary to separately depict them. Further, it is well known that practically all impurities entering a boiler, and all floatable impurities, ultimately reach the active disengagement surface of the boiler water and as it is desirable to remove all such impurities, it is best to arrange the separators or concentrators closely beneath such disengagement surfaces, as well illustrated herein.

As will now be evident to persons skilled in the art, this invention is most opportune in its relation to the generation of steam at the high pressures which best ensure the thermal efficiency of evaporation. Heretofore, high pressures and the temperatures incident thereto have entailed very high costs of feed water preparation, and, because of the impurities in even the best feed waters, have made the operation and maintenance of the boilers hazardous and expensive. In contrast, under this invention, the higher the temperatures the more certain are both soluble and insoluble impurities to be quickly presented to the submerged concentrator and as quickly removed from the boiler, thereby increasing the safety of the operation and permitting a large reduction in the operating expenses.

While the foregoing discussion is limited to water and the generation of steam, it is to be understood that the capabilities of this process and apparatus are not limited thereto. Further this invention is equally well adapted for use in the evaporation or distillation of oils, such as petroleum, and, particularly in the redistillation of such substances. Hence, also in the following claims the term water should be read as meaning liquid generally; the term generator or boiler should be read as meaning any liquid heating vessel and vapor generators generally, and the term steam should be given the significance of vapor, derived by the evaporation of any fluid.

In large part, this application is a voluntary division of my co-pending application Serial No. 327,716, filed December 21st, 1928.

Having thus described my invention, I claim as new and desire to secure by Letters Patent:

1. The process of deconcentration that attends the circulatory and steaming operations of a body of boiler water confined above a fire and which consists in utilizing a part of the steam generated in the boiler for imparting centrifugal motion to the water to thereby separate impurities therefrom within the boiler and independently thereof expelling the impurities from the boiler with an accompanying quantity of said water.

2. A steam boiler, in combination with a centrifugal liquid separator comprising a stationary tuyére; a pump co-operating therewith and causing a positive movement of liquid therethrough, and a separating chamber having an eject pipe leading to an external blow-off device; and a vapor-actuated turbine within the boiler and actuating the pump.

3. A steam boiler, in combination with a centrifugal liquid separator comprising a stationary tuyére; a pump co-operating therewith and causing a positive movement of liquid therethrough, and a separating chamber having an eject pipe leading to an external blow-off device; a vapor-actuated turbine within the boiler and actuating the pump; and external means adapted to control the action of said turbine.

In testimony whereof I have hereunto set my hand this 29th day of January, 1929.

CHARLES GILBERT HAWLEY.